A. NEUMAN.
GRASS CONVEYER FOR LAWN MOWERS.
APPLICATION FILED OCT. 17, 1916.

1,248,382.

Patented Nov. 27, 1917.

Inventor:
Albert Neuman
By Vernon E Hodges
his Atty.

UNITED STATES PATENT OFFICE.

ALBERT NEUMAN, OF DENVER, COLORADO.

GRASS-CONVEYER FOR LAWN-MOWERS.

1,248,382.  Specification of Letters Patent.  Patented Nov. 27, 1917.

Application filed October 17, 1916. Serial No. 126,088.

*To all whom it may concern:*

Be it known that I, ALBERT NEUMAN, a citizen of the United States, residing at the city and county of Denver and State of Colorado, have invented certain new and useful Improvements in Grass-Conveyers for Lawn-Mowers, of which the following is a specification.

My invention relates to an improvement in grass conveyers for lawn-mowers, and the object in view is to provide an attachment which may be attached in place of the usual back-roller, so that it is brought as close to the rotary knives or cutter-bar as possible, in order to catch the grass as it is cut and thrown up by the knives, the conveyer being operated by the traction along the ground, which is adapted to cause the conveyer-belt to move downward and carry the grass as it is caught thereon into the receptacle at the bottom of the conveyer-frame, whence it is carried upward on the lower side to some repository, such as a bag, hung at the upper end, the inclination of the conveyer being determined by the operator and regulated to suit the requirements in any approved manner.

In the accompanying drawings:—

Figure 1:
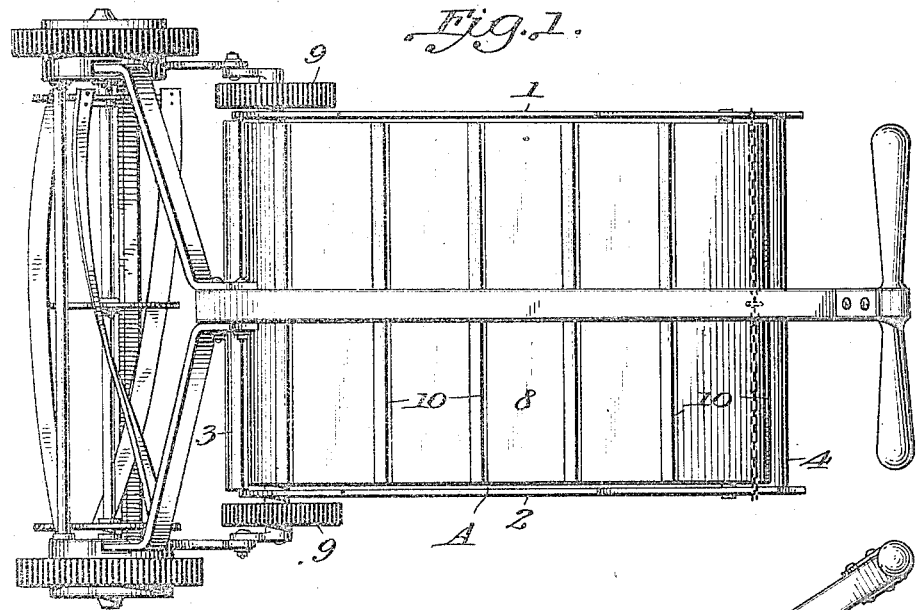
Figure 1 is a plan view.
Figure 2:
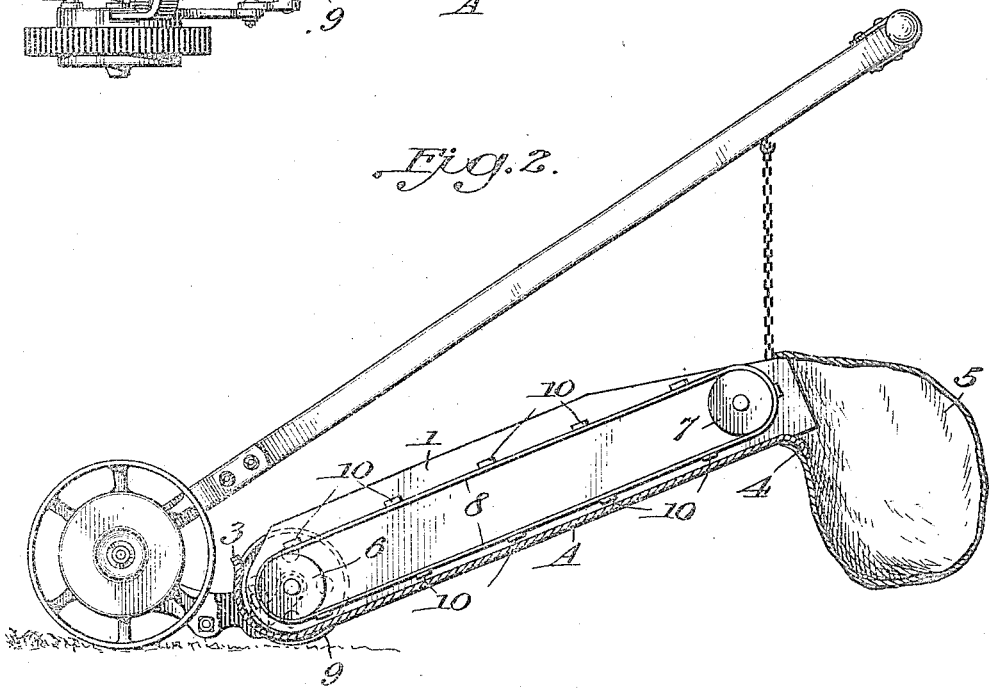
Fig. 2 is a sectional view.

A, represents the bottom, and 1 and 2 the sides of the grass-conveyer. The bottom terminates in an upwardly-extending and forwardly-projected scoop 3 at the lower end, which terminates in more or less close proximity to the rotary knife or cutter-bar of the lawn-mower, it being adapted to receive the grass as it is thrown from the rotary knife or cutter-bar in the cutting operation. The opposite or upper end of the bag preferably flares outwardly as at 4, to facilitate the discharge of the grass into the receptacle 5, hanging therebeneath to catch it.

The foregoing parts may all be made of a single piece of sheet-metal by stamping or otherwise fashioning into shape; or they might, of course, be built in any other suitable manner.

Two shafts 6 and 7 are journaled in the sides of the frame, over which the conveyer belt 8 passes and travels, and the lower shaft 6 is adapted to take the place of the rear roller of a lawn-mower, and has traction-wheels 9, 9, on its outer ends, which travel along the ground, as do the drive-wheels of the lawn-mower. In this way the upper surface of the belt is made to move downwardly in a direction toward the scoop, it being provided at intervals with cleats 10, 10, or other means to force the grass down into the hopper and between the belt and the back of the conveyer-frame, thus forcing it upwardly and out between itself and the back, at the top of the conveyer, whence it discharges into the receptacle 5 provided to receive the grass.

Attached as explained, the conveyer is pivoted at its lower end to the lawn-mower, and its inclination may be varied at any time by the operator by any approved means, such as a chain, or cord, or link connected with its upper end for attachment to the handle of the lawn-mower.

In this simple attachment, all parts are reduced to a minimum. The entire frame is easily, simply, and cheaply made. Unnecessary parts are dispensed with, thus reducing the expense, and insuring lightness as well as efficiency in operation.

I claim:

The combination with a lawn-mower, of a conveyer comprising a frame, two shafts journaled thereon, a conveyer-belt carried over the shafts, one of said shafts also journaled in the lawn-mower and having traction-wheels thereon, whereby the shaft and the conveyer-belt passing thereover are turned by the travel of the lawn-mower.

In testimony whereof I affix my signature.

ALBERT NEUMAN.

Copies of this patent may be obtained for five cents each, by addressing the "Commissioner of Patents, Washington, D. C."